United States Patent
Guedalia et al.

(10) Patent No.: US 7,174,006 B2
(45) Date of Patent: Feb. 6, 2007

(54) METHOD AND SYSTEM OF VOICEXML INTERPRETING

(75) Inventors: David Guedalia, Beit Shemesh (IL); Lawrence Reisler, Beit Shemesh (IL); Gavriel Raanan, Beit Shemesh (IL)

(73) Assignee: NMS Communications Corporation, Farmingham, MA (US)

( * ) Notice: Subject to any disclaimer, the term of this patent is extended or adjusted under 35 U.S.C. 154(b) by 956 days.

(21) Appl. No.: 09/883,757

(22) Filed: Jun. 18, 2001

(65) Prior Publication Data

US 2002/0191756 A1 Dec. 19, 2002

(51) Int. Cl.
*H04M 11/06* (2006.01)

(52) U.S. Cl. ............... 379/88.13; 379/88.17; 379/93.23; 370/356; 704/270; 707/206; 711/137; 712/209

(58) Field of Classification Search ......... 379/88.13, 379/88.04, 93.23, 88.01; 707/513; 717/100–175; 704/270, 275; 712/209

See application file for complete search history.

(56) References Cited

U.S. PATENT DOCUMENTS

| | | | | |
|---|---|---|---|---|
| 6,269,336 B1 * | 7/2001 | Ladd et al. | ............... | 379/88.13 |
| 6,292,883 B1 * | 9/2001 | Augusteijn et al. | ......... | 712/209 |
| 6,349,132 B1 * | 2/2002 | Wesemann et al. | ...... | 379/88.17 |
| 6,456,699 B1 * | 9/2002 | Burg et al. | ............... | 379/88.17 |
| 6,501,832 B1 * | 12/2002 | Saylor et al. | ............ | 379/88.04 |
| 6,560,320 B1 * | 5/2003 | Paleiov et al. | ........... | 379/93.23 |
| 2002/0052747 A1 * | 5/2002 | Sarukkai | ..................... | 704/270 |

OTHER PUBLICATIONS

Nuance SpeechObjects™, 1998. http://www.nuance.com/products/speechobjects.html.

* cited by examiner

*Primary Examiner*—Gerald Gauthier
(74) *Attorney, Agent, or Firm*—Chapin IP Law, LLC; Barry W. Chapin, Esq.

(57) ABSTRACT

A VoiceXML interpreting system and method including a VoiceXML Interpreter. The VoiceXML interpreter includes a Fetcher operative to retrieve documents, a compiler operative to compile documents retrieved by the Fetcher and a cache which stores compiled documents compiled by the compiler.

23 Claims, 5 Drawing Sheets

PRIOR ART

METHOD AND SYSTEM OF VOICEXML INTERPRETING

FIELD OF THE INVENTION

The present invention relates to a VoiceXML Interpreter.

REFERENCE TO COMPUTER PROGRAM LISTING APPENDICES

Computer program listing appendices are submitted herewith on one compact disc and one duplicate compact disc. The total number of compact discs including duplicates is two. The files on the compact disc are ASCII text files in which the characters are displayed as their corresponding values in hexadecimal format. Their names, dates of creation, directory locations, and sizes in bytes are:

1. Directory appndx-a containing file 42876A.HEX (Appendix A) of Jun. 14, 2001 and of length 44,191 bytes.
2. Directory appndx-b containing file 42876B.HEX (Appendix B) of Jun. 14, 2001 and of length 40,769 bytes.

The files are referred to herein as appendices A-B respectively. The material on the compact discs is incorporated by reference herein.

BACKGROUND OF INVENTION

An Interactive Voice Response unit (IVR) is an automated telephone answering system, which responds to a user's telephone call with a voice menu and allows the user to make choices and enter information. IVR systems are widely used in call centers as well as a replacement for human switchboard operators. An IVR system may also integrate database access and fax response.

IVR systems are typically partnered with an appropriate application to provide services. Traditionally, IVR application developers required an in-depth knowledge of one of numerous proprietary IVR development environments, as well as knowledge of a programming language such as C or C++. The development of these applications was both time consuming and costly. Furthermore, IVRs with speech recognition applications required knowledge of proprietary voice recognition systems Recently, the introduction of VoiceXML has alleviated the need of application developers to know the low-level programming necessary to drive the proprietary telephony hardware and speech recognition systems. By enabling the VoiceXML developers to focus on the application and removing the need to understand the low-level programming, the development cycle and the time to market is shortened.

A VoiceXML environment comprises a VoiceXML document on a VoiceXML document server and a VoiceXML Interpreter. The VoiceXML document specifies each interaction dialog to be conducted by a VoiceXML Interpreter. The user's input can affect the dialogue interpretation.

Historically, an IVR unit was a closed system. VoiceXML enables IVR applications to take advantage of a distributed IP network approach, enabled through traditional client/server architecture. VoiceXML uses Internet protocols, particularly HTTP in order to access document servers. One problem with client/server interaction is the process involved in accessing the server in order to retrieve documents. This process can often prove to be lengthy and ineffective. One solution VoiceXML offers is to specify multiple interactions per document, thus minimizing client/server interactions.

An additional solution to the problem of the client/server environment is the use of caching. The VoiceXML Interpreter, just like HTML visual browsers, can use caching to improve performance in fetching documents and other resources. For example, audio recordings, which can be quite large, are as common to VoiceXML documents as images are to HTML pages and therefore should be cached.

HTML browsers typically perform client side caching, whereby the caching is managed by the client. Server side caching is more difficult; the cache must be maintained for the entire application. Multiple users request documents simultaneously, thereby requiring increased efficiency. One example of efficient server side caching is the PERL® module 'mod_perl' used under the APACHE® web server, which compiles and caches PERL® in scripting languages. PERL® (Practical Extraction and Reporting Language) is a popular script language used in programming. PERL® is often used in an APACHE® environment by linking the PERL® runtime library into the server and providing an object oriented PERL® interface to the server's C language API. These components are bound together by the mod_perl server plug-in, making it possible to write APACHE® modules in PERL®.

Another aspect of the VoiceXML environment, a function of the fact that it is a scripting language, is its limited extensibility. The VoiceXML Interpreter essentially only runs scripts and functions in accordance with the relevant VoiceXML specification. In order to obtain a level of enhanced functionality, the specification specifies the object tag. An object tag primarily imports outside resources into a web page, such as JAVA® applets, multimedia files, web plug-ins or ACTIVEX® components. Object tags enable the addition of special functions and local functions external to the current VoiceXML specification. An example of one such implementation of object tags is NUANCE's®, which employs a virtual JAVA® machine. Through the use of tags, the application developer can specify JAVA® speech objects (modules), which are loaded into the JAVA® virtual machine and provide enhanced functionality.

The VoiceXML environment adds complexity to IVR systems. This complexity makes it harder to fulfill the requirement for high availability, whereby the IVR user interacting with the system should experience as little interference and malfunction as possible.

SUMMARY OF THE INVENTION

This invention seeks to provide a system and methodology for a flexible, robust and scalable VoiceXML Interpreter, which provides efficient rendering of VoiceXML documents.

There is thus provided in accordance with a preferred embodiment of the present invention a VoiceXML interpreting system including a VoiceXML Interpreter. The VoiceXML interpreter includes a Fetcher operative to retrieve documents, a compiler operative to compile documents retrieved by the Fetcher and a cache which stores compiled documents compiled by the compiler.

There is further provided in accordance with a preferred embodiment of the present invention a VoiceXML interpreting method. The VoiceXML interpreting method includes retrieving documents, compiling retrieved documents and caching compiled documents compiled by the compiler.

Further in accordance with a preferred embodiment of the present invention the VoiceXML interpreting system also includes Storage Device, which stores state information, related to execution of the compiled documents. Preferably, the VoiceXML interpreting system further includes a backup VoiceXML Interpreter communicating with the Storage Device. The Storage Device preferably includes a memory database external to the VoiceXML Interpreter and to the backup Interpreter.

There is also provided in accordance with a preferred embodiment of the present invention a VoiceXML interpreting system. The VoiceXML interpreting system includes a Fetcher operative to retrieve documents and a Storage Device, which stores state information related to execution of the documents.

Further in accordance with a preferred embodiment of the present invention the VoiceXML interpreting system also includes a backup VoiceXML Interpreter communicating with the Storage Device. Preferably, the Storage Device includes a memory database external to the VoiceXML Interpreter and to the backup Interpreter.

There is further provided in accordance with another preferred embodiment of the present invention a VoiceXML interpreting system. The VoiceXML interpreting system includes a communication device, telephony hardware communicating with the communication device, a switchboard communicating with the telephony hardware, a VoiceXML Interpreter communicating with the switchboard and an object module communicating with the at least one of the telephony hardware, switchboard and VoiceXML Interpreter.

There is also provided in accordance with yet another preferred embodiment of the present invention a VoiceXML interpreting method. The VoiceXML interpreting method includes retrieving documents and storing state information related to execution of the documents.

Further in accordance with a preferred embodiment of the present invention the object module includes a dynamically loadable library. Preferably, the dynamically loadable library is operative to allocate telephone resources.

There also is provided in accordance with yet a further preferred embodiment of the present invention a VoiceXML interpreting system. The VoiceXML interpreting system includes a communication device, telephony hardware communicating with the communication device, a switchboard communicating with the telephony hardware, a VoiceXML Interpreter communicating with the switchboard and an object module communicating with the at least one of the telephony hardware, switchboard and VoiceXML Interpreter.

Further in accordance with a preferred embodiment of the present invention the object module includes a dynamically loadable library. Preferably, the dynamically loadable library is operative to allocate telephone resources.

BRIEF DESCRIPTION OF THE DRAWINGS AND APPENDICES

The present invention will be more fully understood and appreciated from the following detailed description, taken in conjunction with the following drawings and appendices in which.

DESCRIPTION OF COMPUTER LISTING APPENDICES

Appendix A is a sample of a DLL file used to load a random number generator application, in accordance with a preferred embodiment of the present invention; and Appendix B is a sample of a DLL file used to load a DTMF generator application, in accordance with a preferred embodiment of the present invention.

DETAILED DESCRIPTION OF A PREFERRED EMBODIMENT

The present invention provides a system and methodology for a flexible, robust and scalable VoiceXML Interpreter, which provides efficient rendering of VoiceXML documents. Prior art modules such as mod_perl cannot remotely fetch documents and are not able to work in either XML environments or telephony environments. Whereas prior art VoiceXML systems can cache fetched resources, the present invention improves efficiency by caching compiled and optimized internal representations of raw fetched data. Furthermore, in accordance with the present invention, the caching of complied data is performed in an environment capable of simultaneous handling of multiple client requests through the same server.

In accordance with the present invention, the raw fetched data is first preprocessed into a ready-to-use binary format, rather than raw data directly available from the fetching transaction. When the data is in this binary format, the data can be used concurrently by multiple users of the application. This saves on processing time, as there is only one conversion per cached resource and only one binary copy shared by many users within the application. This also saves on memory because the optimized data may reduce the volume of the data.

Figure 1:
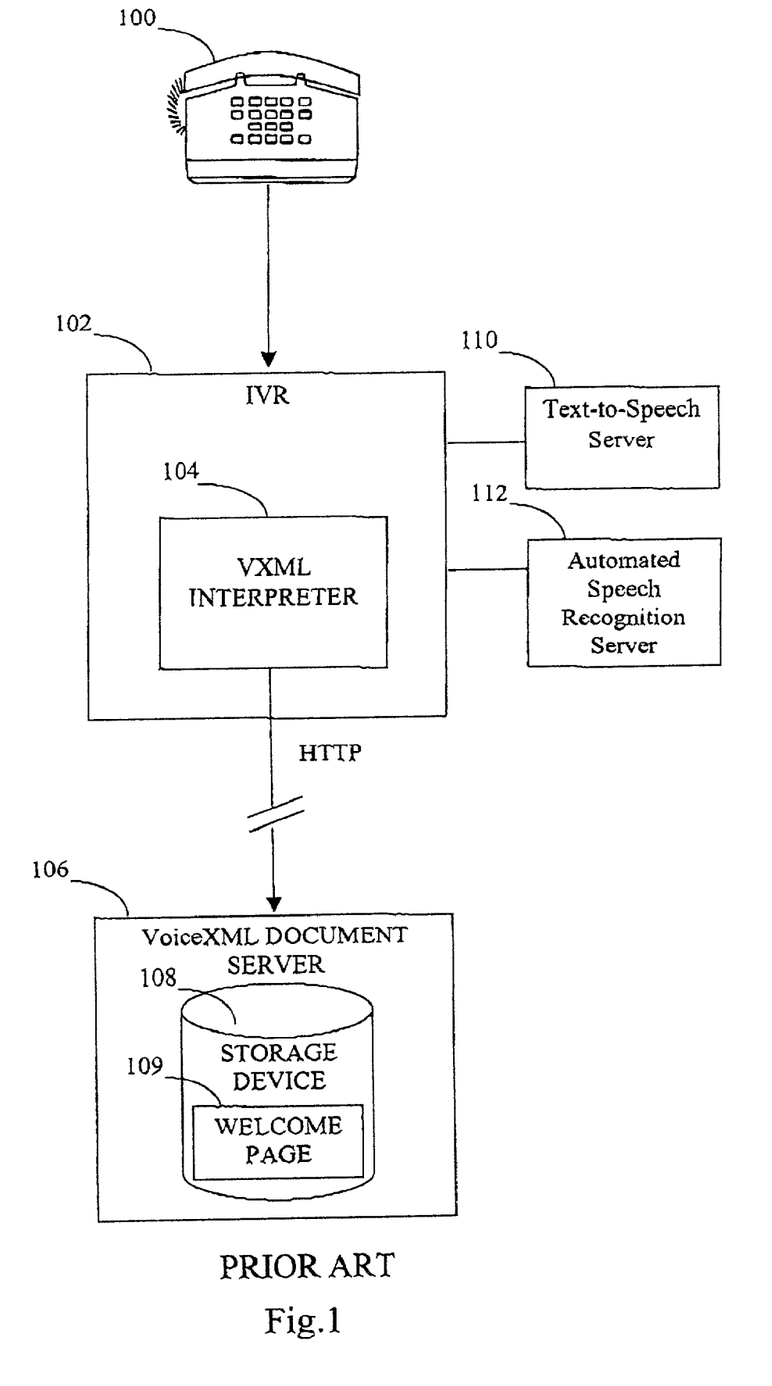
FIG. 1 is a simplified block diagram illustration of a prior art VoiceXML environment, constructed and operative in accordance with a preferred embodiment of the present invention.

Reference is now made to FIG. 1, which is a simplified block diagram illustration of a prior art VoiceXML environment. In the example shown, a user 100 wishing to access web-based information such as general news items using the telephone, typically places a telephone call to an IVR 102. The IVR 102, containing a VoiceXML Interpreter 104, queries a VoiceXML document server 106 for information and the VoiceXML document server 106 accesses the information from a Storage Device 108. The VoiceXML Interpreter 104 may request a welcome page 109. The VoiceXML Interpreter 104 may retrieve the welcome page 109 from the Storage Device 108 within the VoiceXML document server 106 and may run the script embedded in the welcome page 109. The script may reference a recorded welcome message in the form of a Wav file. Alternatively the script may be a simple piece of 'welcome' text that is sent to an external Text-to-Speech server 110 and converted into audio by the VoiceXML Interpreter 104. The welcome message may then be played back to the user 100 and the VoiceXML Interpreter 104 may await user input.

Next, the user 100 may communicate a speech command via the telephone such as "May I please have the latest stock quotes". The VoiceXML Interpreter 104 receives the speech and relays the speech to an Automated Speech Recognition server (ASR) 112. The Automated Speech Recognition server 112 recognizes the user's speech and identifies what the user said. The Automated Speech Recognition server 112 may have a limited number of recognized responses and, depending on the user's input, may send back an appropriate response to the VoiceXML Interpreter 104. In this fashion, a dialogue exists between the VoiceXML Interpreter 104 and the user 100. Alternatively, a DTMF input is used instead of speech.

Figure 2:
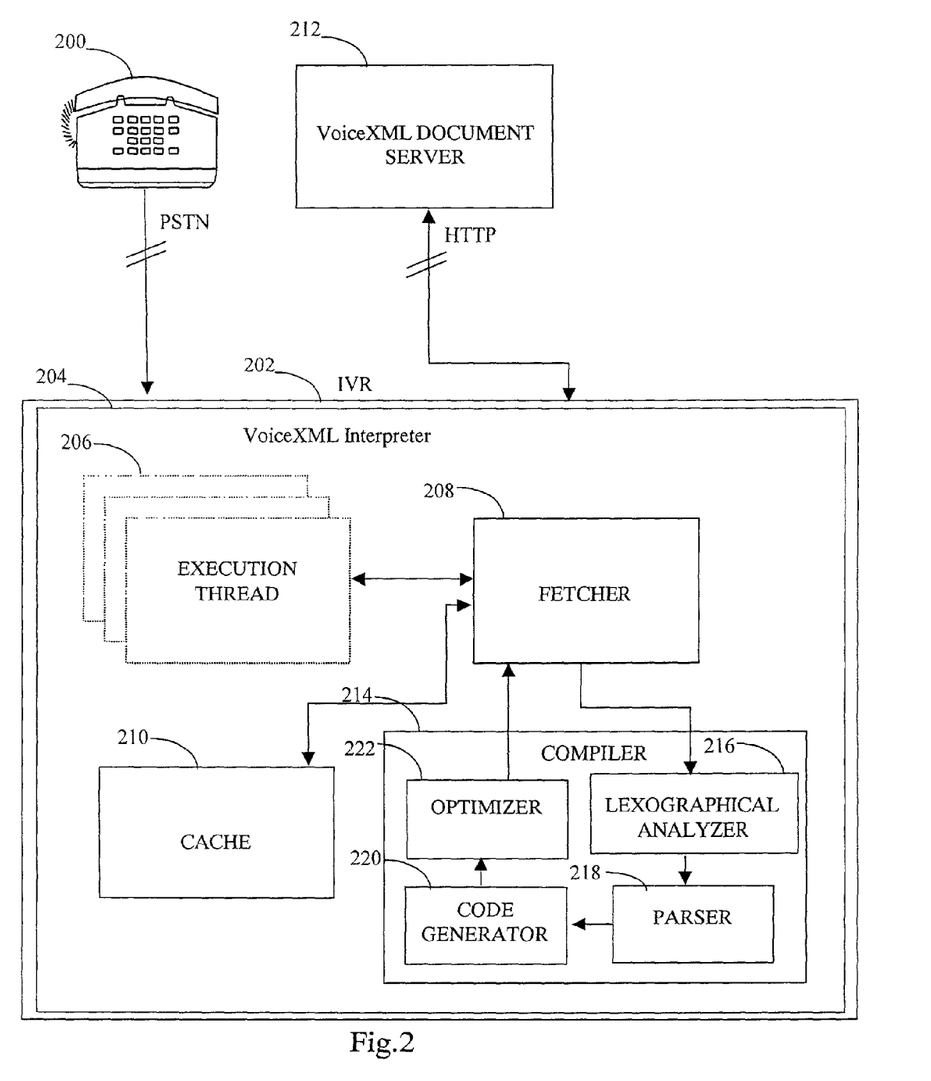
FIG. 2. is a simplified block diagram illustrating the structure and operation of the VoiceXML environment of FIG. 1, in accordance with a preferred embodiment of the present invention.
Figure 3:
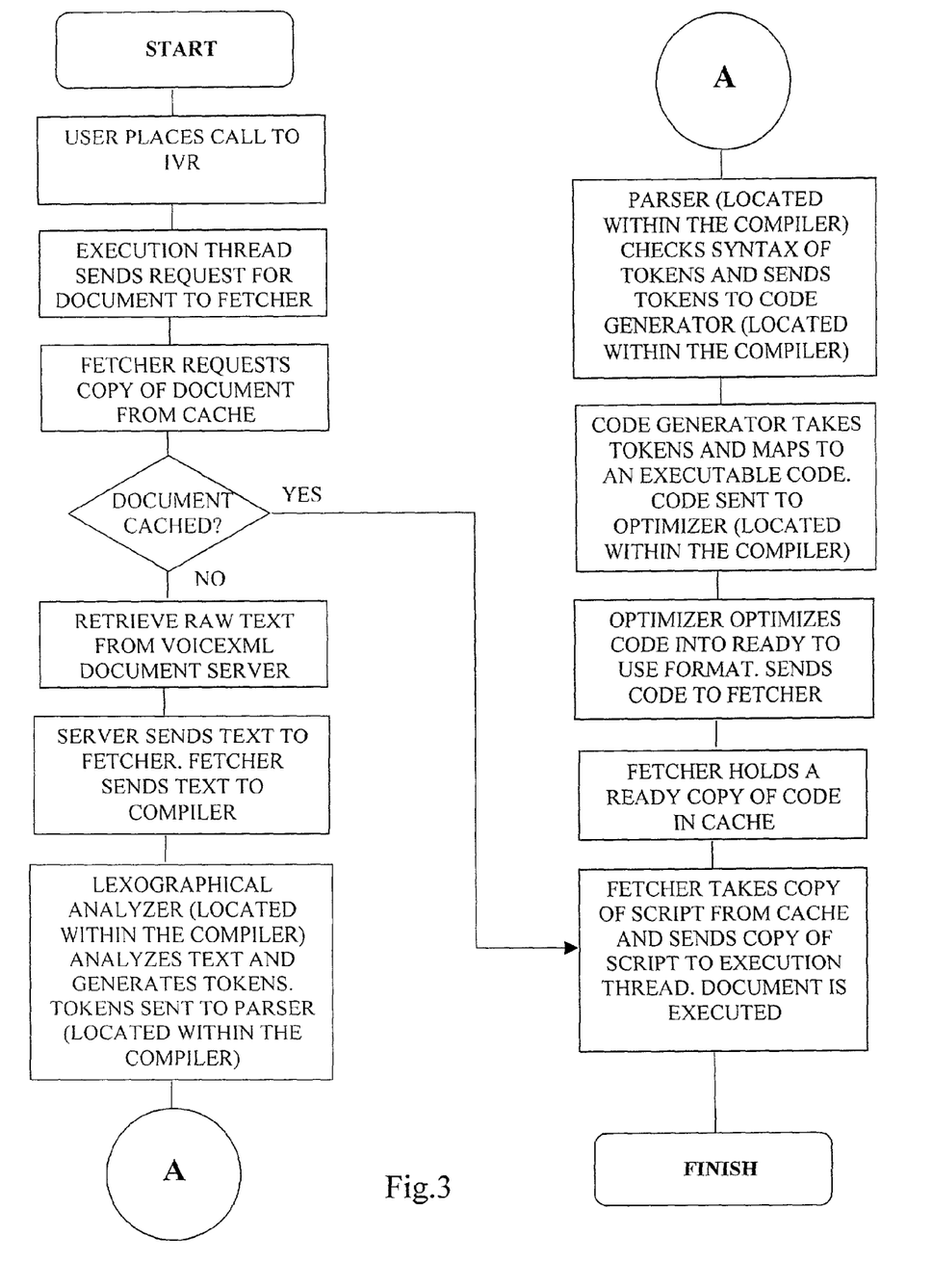
FIG. 3. is a simplified flow chart, illustrating operation of the system of FIGS. 1 and 2 in accordance with a preferred embodiment of the present invention.

Reference is now made to FIG. 2, which is a simplified block diagram illustrating the structure and operation of an improved VoiceXML Interpreter 204, constructed and operative in accordance with a preferred embodiment of the present invention and having optimized caching. Reference is also made to FIG. 3, which is a simplified flowchart illustrating operation of the system of FIG. 2 in an environment of FIG. 1, in accordance with a preferred embodiment of the present invention.

As seen in FIGS. 2 and 3, a user 200 places a telephone call to an IVR 202. The IVR 202 connects to the VoiceXML Interpreter 204. The VoiceXML Interpreter 204 activates an Execution Thread 206 to begin processing the call. The Execution Thread 206 sends a request for an initial document to a Fetcher 208. The Fetcher 208 requests a copy of the document from a Cache 210. If the Cache 210 already contains a copy of the requested document, the Fetcher 208 retrieves a copy of the document from the Cache 210 and sends it to the Execution Thread 206, which executes the script.

If the Cache 210 does not contain a copy of the requested document, the Fetcher 208 connects to a VoiceXML Document server 212 to retrieve a raw copy of the document. The Fetcher 208 sends the raw document to a Compiler 214, which comprises a Lexographical Analyzer 216, a Parser 218, a Code Generator 220 and an Optimizer 222. The Lexographical Analyzer 216 analyzes the text and generates 'tokens'. These tokens are sent to the Parser 218, where they are syntactically analyzed. The Parser 218 then sends the tokens to the Code Generator 220, where the tokens are mapped to a binary code that is executable. The executable code could be of various types, such as ASCII, EBCDIC or JAVA® byte codes.

Once the code is deemed executable, it is relayed to the Optimizer 222. The Optimizer 222 optimizes the code and prepares the code for use. The prepared code is sent to the Fetcher 208. The Fetcher 208 places a copy of the prepared code in the Cache 210 and sends a reference of the prepared code to the Execution Thread 206.

In a preferred embodiment of the present invention, the prepared executable code is saved in memory. In another preferred embodiment of the present invention, the prepared executable code is stored on an external device, such as a disk.

Figure 4:
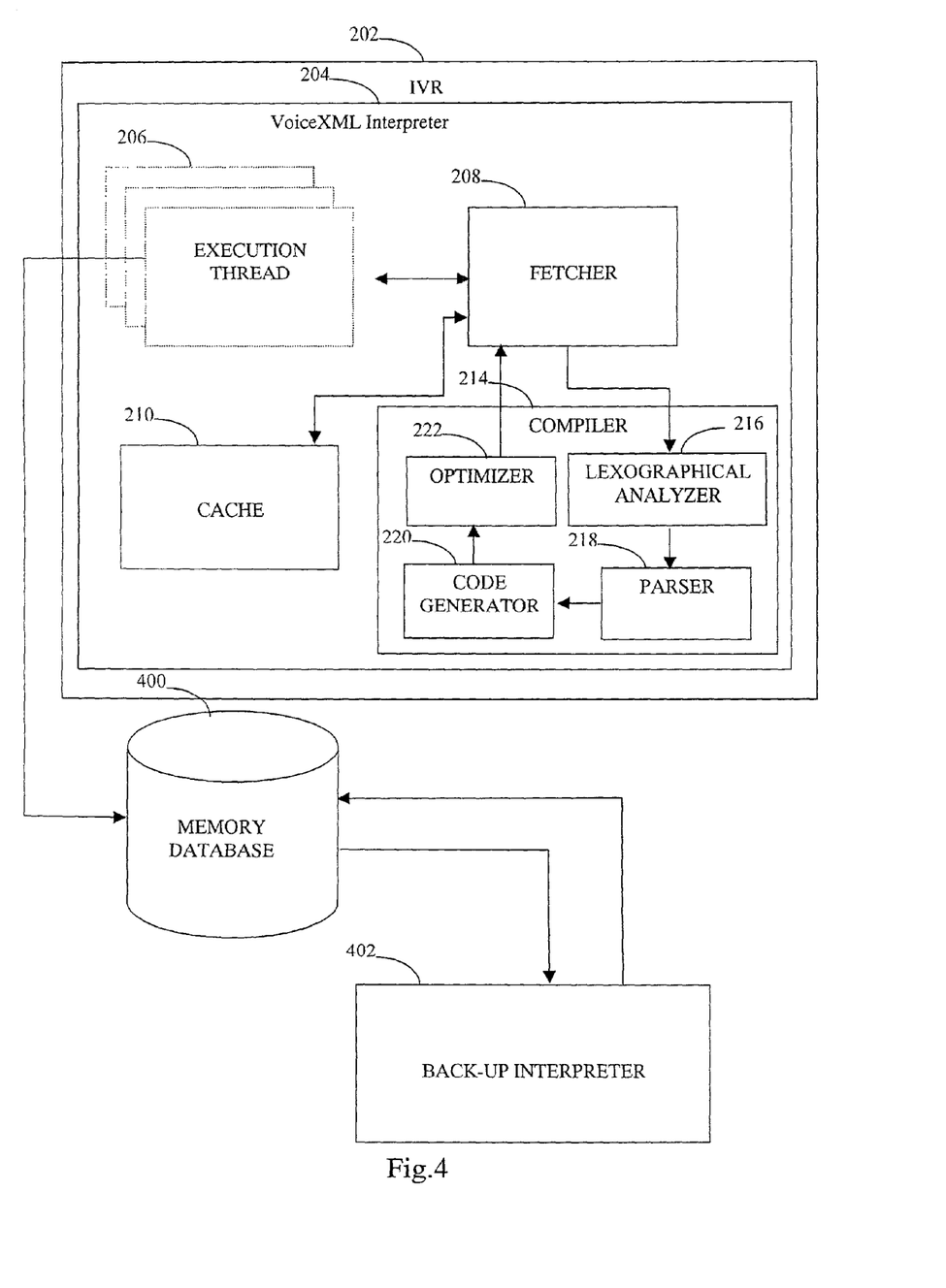
FIG. 4 is a simplified block diagram illustrating the architecture involved in extracting state information from the VoiceXML Interpreter.

Reference is now made to FIG. 4, which is a simplified block diagram illustrating a preferred architecture involved in extracting state information from the VoiceXML Interpreter 204. The current state of the VoiceXML Interpreter 204 is abstracted to enable high availability of data. In order to protect data in the event of a crash, the current state information is offloaded onto a Memory Database 400 that can be accessed by a Back-up Interpreter 402, which may take over from the VoiceXML Interpreter 204 in the event that the primary IVR 206 fails.

Figure 5:
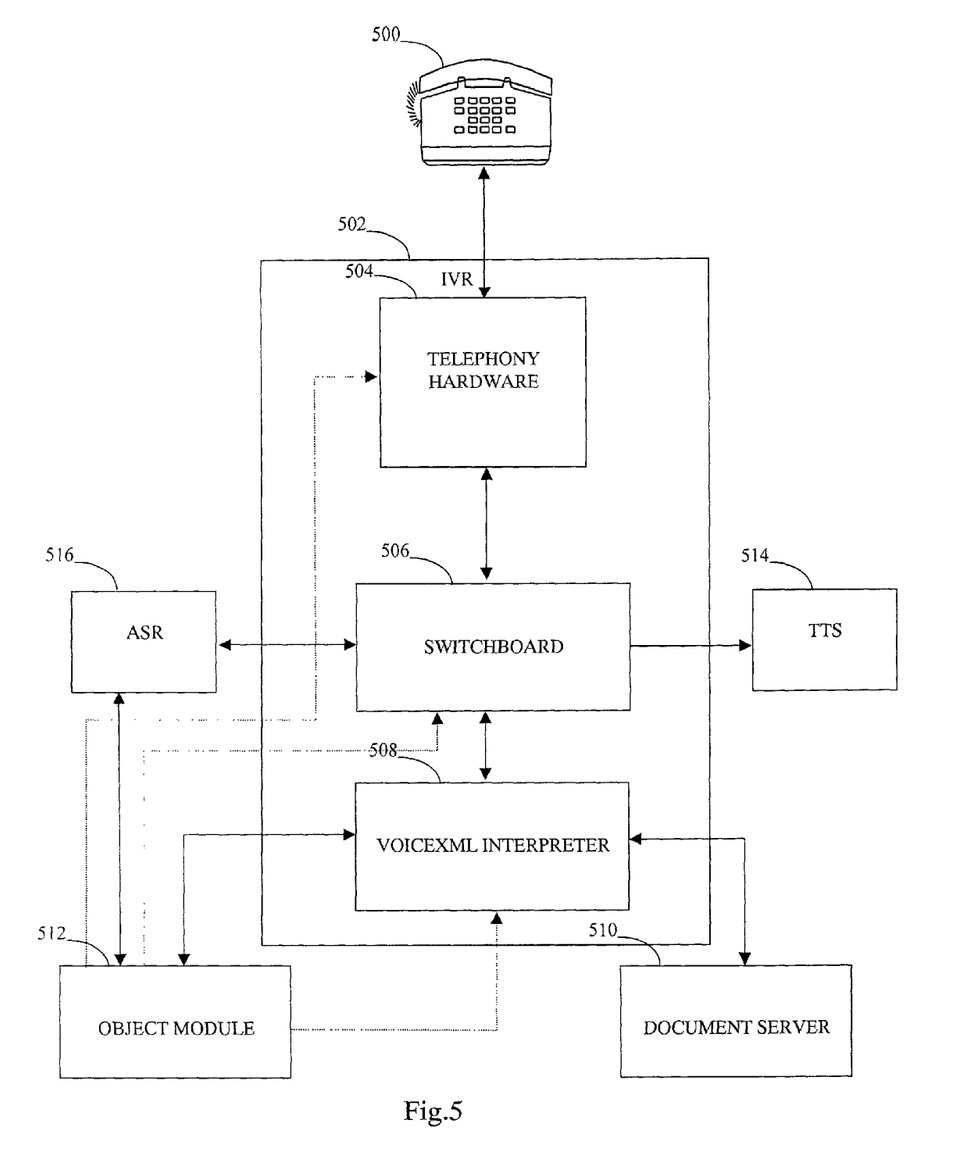
FIG. 5 is a simplified block diagram illustrating the implementation of object tag extensions, in accordance with a preferred embodiment of the present invention.

Reference is now made to FIG. 5, which is a simplified block diagram illustrating one implementation of object tag extensions. In one embodiment of the present invention, an object tag is used to enable fax transmission. For example, a user 500 who wishes to send a fax, makes a call to the IVR 502. Telephony Hardware 504, located within the IVR 502 detects the telephone call and notifies a Switchboard 506. The Switchboard 506 instructs the Telephony Hardware 504 to answer the call. After the Telephony Hardware 504 answers the call, the Switchboard 506 queries the VoiceXML Interpreter 508 for further instructions. The VoiceXML Interpreter 508 may fetch the application from the Document Server 510, which queries the user 500 for the destination fax address and the content of the fax. For example, the application may play a Wav file though the VoiceXML Interpreter 508.

Having received a destination fax address/number and fax content from the user 500, the VoiceXML Interpreter 508 may execute the object tag that instructs the transmission of the fax. In one embodiment of the present invention, the Object Module 512 refers to a Dynamic Link Library (DLL). The VoiceXML Interpreter 508 loads the DLL, which is typically found and loaded to memory. In another embodiment of the present invention the Object Module 512 is a UNIX® shared object library. In another embodiment of the present invention, the library may be a dynamically loadable library or a static library.

The VoiceXML Interpreter 508 invokes an 'execute' function in the Object Module 512 and communicates parameters, such as the fax number and an on-dick reference to the content of the fax. The VoiceXML Interpreter 508 also communicates the access point to the Telephony Hardware 504, which enables the loaded library to directly access the Telephony Hardware 504. For instance, direct access to the Telephony Hardware 504 could enable the library to directly allocate telephone resources, such as a telephone line, for fax transmission.

Additionally, the Object Module 512 may send back a response, such as an error result, to the user 500 via Text-to-Speech Server (TTS) 514. Furthermore, the Object Module 512 may utilize the ASR 516 functionality. For example, the ASR 516 may convert a recorded message to text, for fax transmission.

It will be appreciated by persons skilled in the art that the present invention is not limited by what has been particularly shown and described hereinabove. Rather the present invention includes combinations and sub-combinations of the various features described hereinabove as well as modifications and extensions thereof, which would occur to a person skilled in the art and which do not fall within the prior art.

The invention claimed is:

1. An interactive voice response system comprising:
   a compiler operative to compile documents retrieved by a fetcher into compiled document data in executable form;
   a cache which stores the compiled document data prior to receipt of audio input from a given user requesting a text-based document;
   an execution thread that executes compiled document data retrieved from the cache by the fetcher;
   a storage device, which stores state information related to execution of said compiled document data; and
   a backup VoiceXML Interpreter communicating with said storage device, the backup interpreter providing a response to a user in the event of a failure associated with a primary voice response system.

2. A system according to claim 1, wherein said storage device comprises a memory database external to said backup VoiceXML Interpreter.

3. In an interactive voice response system, a method comprising:
  retrieving documents encoded according to VoiceXML;
  compiling the retrieved documents into compiled document data in executable form;
  caching the compiled document data for later retrieval and execution;
  storing state information related to execution of said compiled document data; and
  providing a backup VoiceXML Interpreter that utilizes the stored state information to support continued service in the event of a failure.

4. An interactive voice response system configured as a server that provides requested audio information associated with text-based documents, the server comprising:
  an execution thread that processes an incoming request and, based on an audio input from a given user, identifies a request for audio information associated with a text-based document; and
  a fetcher that receives a signal from the execution thread to search a cache for executable code associated with the requested audio information, the fetcher retrieving corresponding executable code from the cache for execution by the execution thread to satisfy the request for audio information associated with the incoming request;
  wherein the fetcher initiates communication with a remote server to retrieve a text-based document associated with the requested information if corresponding executable code is not stored in the cache;
  a compiler that converts retrieved text-based documents into executable code for storage in the cache; and
  the server coupled to a database that stores state information associated with executable code being executed by the execution thread, the state information accessible by a backup interpreter to provide interactive voice response service in the event of a failure associated with the interactive voice response system.

5. A server as in claim 4 further comprising:
  a compiler that converts the text-based document into executable speech code for storage in the cache prior to receipt of the incoming request.

6. A server as in claim 4, wherein executable code stored in the cache is concurrently utilized by multiple execution threads to provide a response to multiple users.

7. A server as in claim 4 further comprising:
  a storage device to store state information related to the executable code executed by the execution thread to satisfy the request for audio information associated with the incoming request.

8. A server as in claim 4, wherein the executable code retrieved from the cache is associated with a corresponding viewable text-based document available on the World Wide Web.

9. A server as in claim 4, wherein the execution thread receives the incoming call from a switchboard.

10. A server as in claim 4 configured as a VoiceXML interpreter.

11. A server as in claim 5, wherein the compiler converts the text-based document into executable code in response to a previous request by another user for the text-based document.

12. A server as in claim 4, wherein the executable code stored in the cache is used at a later time to respond to corresponding future requests with respect to the text-based documents.

13. A server as in claim 4, wherein the backup interpreter is a backup VoiceXML interpreter.

14. A method of providing requested audio information associated with text-based documents, the method comprising:
  processing an incoming call based on an audio input from a given user;
  identifying a request for audio information associated with a text-based document;
  searching a cache for executable code associated with the requested audio information, the executable code generated in response to a previous request from another user for audio information associated with the text-based document;
  executing corresponding executable code from the cache to satisfy the request for audio information associated with the incoming call; and
  implementing a backup interpreter to process a subsequent incoming call if a primary interactive voice response system happens to fail during processing of the subsequent incoming call.

15. A method as in claim 14, wherein searching the cache for executable code associated with the requested audio information includes:
  searching amongst multiple sets of stored executable code in the cache for the executable code associated with the requested information, the multiple sets of executable code in the cache corresponding to documents previously compiled as a result of other respective users previously requesting audio information associated with the documents.

16. A method as in claim 14, wherein implementing the backup interpreter includes implementing a VoiceXML backup interpreter to process the subsequent incoming call.

17. An interactive voice response system that provides requested audio information associated with text-based documents, the interactive voice response system comprising:
  an execution thread that processes an incoming request and, based on an audio input from a given user, identifies a request for audio information associated with a text-based document;
  a cache that stores sets of executable code associated with corresponding previously compiled documents that can be requested from the given user;
  a fetcher that receives a signal from the execution thread to search the cache for executable code associated with the requested audio information, the fetcher conditionally retrieving corresponding executable code from the cache for execution by the execution thread to satisfy the request for audio information associated with the incoming and
  the interactive voice response system coupled to a database that stores state information associated with executable code being executed by the execution thread, the state information accessible by a backup interpreter to provide interactive voice response service during a failure associated with the interactive voice response system.

18. An interactive voice response system as in claim 17, wherein the corresponding executable code is stored in the cache as a result of a previous request with respect to the text-based document, the fetcher searching the cache in order to retrieve the corresponding executable code from the cache for execution of the corresponding execution code by the execution thread to satisfy the request for audio information associated with the incoming request.

19. An interactive voice response system as in claim 18, wherein the corresponding executable code is executable speech code, the interactive voice response system further comprising:
a compiler that converts the text-based document into the executable speech code for storage in the cache prior to receipt of the incoming request.

20. An interactive voice response system as in claim 19, wherein the fetcher initiates communication with a remote server to retrieve a text-based document associated with the requested information over a network connection if the corresponding executable code were not stored in the cache.

21. An interactive voice response system as in claim 19, wherein the corresponding executable code fetched from the cache is concurrently utilized by multiple execution threads to provide a response to multiple users for requests with respect to a same text-based document.

22. An interactive voice response system as in claim 19, wherein the corresponding executable code retrieved from the cache is associated with a corresponding viewable text-based document accessible over the World Wide Web.

23. An interactive voice response system as in claim 17, wherein the backup interpreter processes incoming requests by interpreting retrieved documents that are coded according to an interactive voice application programming language.

* * * * *